United States Patent
Tang et al.

(10) Patent No.: US 9,326,294 B2
(45) Date of Patent: Apr. 26, 2016

(54) SYSTEM AND METHOD FOR GROUPING AND ASSIGNING CHANNELS IN A NETWORK SYSTEM

(71) Applicant: Aruba Networks, Inc., Sunnyvale, CA (US)

(72) Inventors: Hin Man Tang, Hong Kong (CN); Subbu Ponnuswamy, Saratoga, CA (US); Jeng Yuh Chang, Sunnyvale, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 14/445,800

(22) Filed: Jul. 29, 2014

(65) Prior Publication Data

US 2016/0037542 A1    Feb. 4, 2016

(51) Int. Cl.
*H04W 4/00* (2009.01)
*H04W 72/10* (2009.01)
*H04W 72/04* (2009.01)

(52) U.S. Cl.
CPC .......... *H04W 72/10* (2013.01); *H04W 72/0426* (2013.01)

(58) Field of Classification Search
None
See application file for complete search history.

(56) References Cited

U.S. PATENT DOCUMENTS

| | | | |
|---|---|---|---|
| 2002/0054578 A1* | 5/2002 | Zhang et al. | 370/328 |
| 2003/0040319 A1* | 2/2003 | Hansen et al. | 455/452 |
| 2003/0129987 A1* | 7/2003 | Tanay et al. | 455/450 |
| 2004/0151137 A1* | 8/2004 | McFarland et al. | 370/329 |
| 2008/0032731 A1* | 2/2008 | Shen et al. | 455/522 |
| 2009/0034457 A1* | 2/2009 | Bahl et al. | 370/329 |
| 2009/0221286 A1* | 9/2009 | Kim et al. | 455/434 |
| 2009/0257380 A1* | 10/2009 | Meier | 370/329 |
| 2010/0144359 A1* | 6/2010 | Song et al. | 455/450 |
| 2013/0183998 A1* | 7/2013 | Pylappan et al. | 455/456.1 |
| 2014/0050156 A1* | 2/2014 | Chan et al. | 370/329 |

* cited by examiner

*Primary Examiner* — Edan Orgad
*Assistant Examiner* — Rebecca Song
(74) *Attorney, Agent, or Firm* — Mannava & Kang, P.C.

(57) ABSTRACT

System and methods are provided for dynamically assigning wireless channels to priority groups based on characteristics of the channels, the environment in which the channels will be used, regulatory requirements, and/or capabilities of client devices. Thereafter, channels may be intelligently assigned to access points to achieve one or more goals. For example, wireless channels may be assigned to access points to ensure balanced coverage throughout the network system for client devices of each type/capability, to minimize effects of wireless interference in the network system, to increase fault tolerance in the network system, and/or to generally improve the coverage and quality of connections in the network system.

15 Claims, 9 Drawing Sheets

SYSTEM AND METHOD FOR GROUPING AND ASSIGNING CHANNELS IN A NETWORK SYSTEM

TECHNICAL FIELD

The present disclosure relates to dynamically categorizing wireless channels based on priorities and assigning channels to access points to ensure well-balanced, wide coverage, of stable channels in a network system.

BACKGROUND

Over the last decade, there has been a substantial increase in the use and deployment of wireless client devices, from dual-mode smartphones to tablets capable of operating in accordance with a particular Institute of Electrical and Electronics Engineers (IEEE) standard. With "wireless" becoming the de-facto medium for connectivity among users, it has become increasingly important for network systems to intelligently manage connections.

In some systems, multiple access points may be used to cover a particular area. Each of these access points may operate using separate wireless channels. However, in these traditional systems assignment of channels is performed based on the assumption that each channel is equal. This assumption may result in a network system that fails to adequately support particular client devices and/or provides poor network coverage.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
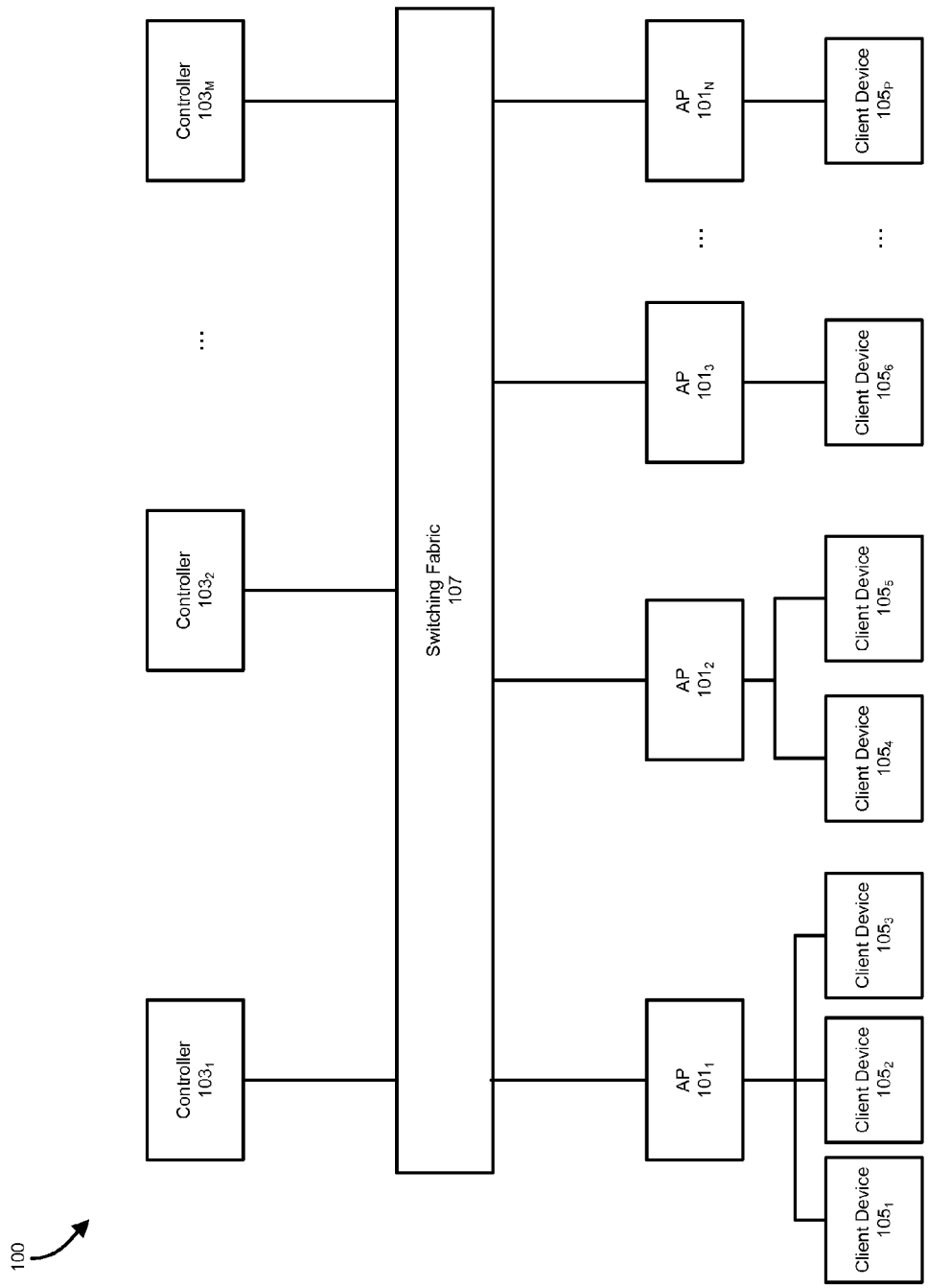
FIG. 1 shows a block diagram example of a network system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Network System

FIG. 1 shows a block diagram example of a network system 100 in accordance with one or more embodiments. The network system 100, as illustrated in FIG. 1, is a digital system that may include a plurality of digital devices such as one or more access points $101_1$-$101_N$, one or more network controllers $103_1$-$103_M$, and one or more client devices $105_1$-$105_P$. The access points $101_1$-$101_N$ and the network controllers $103_1$-$103_M$ may be connected through the switching fabric 107 via wired and/or wireless connections. The client devices $105_1$-$105_P$ may be connected or otherwise associated with the access points $101_1$-$101_N$ through corresponding wireless connections. As will be described in greater detail below, each of the access points $101_1$-$101_N$ may be assigned wireless channels for communicating with other devices in the network system 100 (e.g., the client devices $105_1$-$105_P$). In particular, wireless channels available for communication in the network system 100 may be grouped based on priority. Thereafter, wireless channels from these groups may be assigned to access points $101_1$-$101_N$ to ensure well-balanced, wide coverage, of stable channels in the network system 100. Processes and techniques for grouping and assigning channels to access points $101_1$-$101_N$ based on various factors will be described in greater detail below.

The network system 100 may be installed/distributed in any region or area. For example, the network system 100 may be installed in an office building or another similar structure. The location the network system 100 is installed/distributed in defines a network environment. The network environment may be described by various characteristics, including size, location (e.g., country, state, county, city, etc.), and radio frequency (RF) characteristics of the area (e.g., RF interference or overlap with wireless channels of other systems).

Each element of the network system 100 will be described below by way of example. In one or more embodiments, the network system 100 may include more or less devices than the devices illustrated in FIG. 1, which may be connected to other devices within the network system 100 via wired and/or wireless mediums. For example, in other embodiments, the network system 100 may include additional access points 101, network controllers 103, and/or client devices 105 than those shown in FIG. 1.

Figure 2:
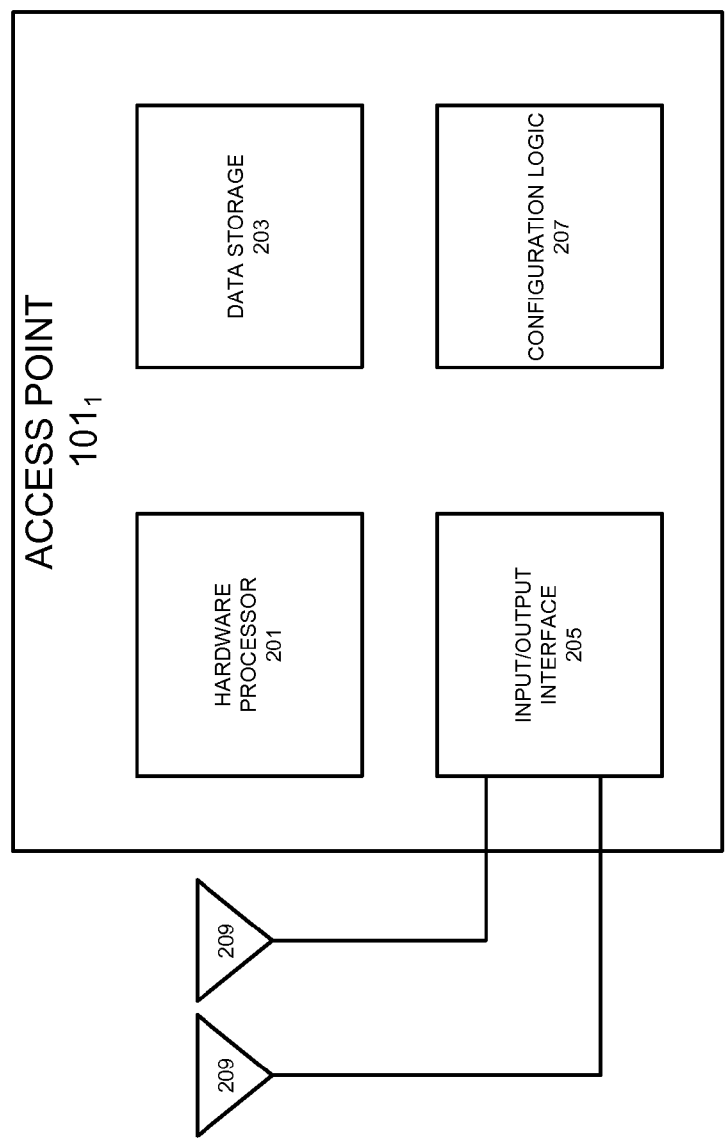
FIG. 2 shows a block diagram example of an access point in accordance with one or more embodiments.

The access points $101_1$-$101_N$ may be any device that can associate with the client devices $105_1$-$105_P$ to transmit and receive data over wireless channels. Each of the access points $101_1$-$101_N$ may operate on various wireless channels (i.e., frequency segments) that are assigned as described in greater detail below. In one embodiment, the access points $101_1$-$101_N$ may correspond to a network device such as a wireless access point, a switch, a router, or any combination thereof. FIG. 2 shows a component diagram of the access point $101_1$ according to one embodiment. In other embodiments, the access points $101_2$-$101_N$ may include similar or identical components to those shown and described in relation to the access point $101_1$.

As shown in FIG. 2, the access point $101_1$ may comprise one or more of: a hardware processor 201, data storage 203, an input/output (I/O) interface 205, and device configuration logic 207. Each of these components of the access point $101_1$ will be described in further detail below.

The data storage 203 of the access point $101_1$ may include a fast read-write memory for storing programs and data during performance of operations/tasks and a hierarchy of persistent memory, such as Read Only Memory (ROM), Erasable Programmable Read Only Memory (EPROM,) and/or Flash memory for example, for storing instructions and data needed for the startup and/or operation of the access point $101_1$. In one embodiment, the data storage 203 is a distributed set of data storage components. The data storage 203 may store data that is to be transmitted from the access point $101_1$ or data that is received by the access point $101_1$. For example, the data storage 203 of the access point $101_1$ may store data to be forwarded to the client devices $105_1$-$105_P$ or to one or more of the network controllers $103_1$-$103_M$.

In one embodiment, the I/O interface 205 corresponds to one or more components used for communicating with other devices (e.g., the client devices $105_1$-$105_P$, the network controllers $103_1$-$103_M$, and/or other access points $101_2$-$101_N$) via wired or wireless signals. The I/O interface 205 may include a wired network interface such as an IEEE 802.3 Ethernet interface and/or a wireless interface such as an IEEE 802.11 WiFi interface. The I/O interface 205 may communicate with the client devices $105_1$-$105_P$ and the network controllers $103_1$-$103_M$ over corresponding wireless channels in the system 100. In one embodiment, the I/O interface 205 facilitates communications between the access point $101_1$ and one or more of the network controllers $103_1$-$103_M$ through the switching fabric 107. In one embodiment, the switching fabric 107 includes a set of network components that facilitate communications between multiple devices. For example, the switching fabric 107 may be composed of one or more switches, routers, hubs, etc. These network components that comprise the switching fabric 107 may operate using both wired and wireless mediums.

In some embodiments, the I/O interface 205 may include one or more antennas 209 for communicating with the client devices $105_1$-$105_P$, the network controllers $103_1$-$103_M$, and/or other wireless devices in the network system 100. For example, multiple antennas 209 may be used for forming transmission beams to one or more of the client devices $105_1$-$105_P$ or the network controllers $103_1$-$103_M$ through adjustment of gain and phase values for corresponding antenna 209 transmissions. The generated beams may avoid objects and create an unobstructed path to the client devices $105_1$-$105_P$ and/or the network controllers $103_1$-$103_M$.

In some embodiments, the access point $101_1$ may include multiple radios for performing wireless transmissions. In these embodiments, each radio in the access point $101_1$ may be assigned a separate wireless channel as will be described in greater detail below.

In one embodiment, the hardware processor 201 is coupled to the data storage 203 and the I/O interface 205. The hardware processor 201 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 207 includes one or more functional units implemented using firmware, hardware, software, or a combination thereof for configuring parameters associated with the access point $101_1$. In one embodiment, the device configuration logic 207 may be configured to allow the access point $101_1$ to associate with different client devices $105_1$-$105_P$.

As described above, the other access points $101_2$-$101_N$ may be similarly configured as described above in relation to access point $101_1$. For example, the access points $101_2$-$101_N$ may each comprise a hardware processor 201, data storage 203, an input/output (I/O) interface 205, and device configuration logic 207 in a similar fashion as described above in relation to the access point $101_1$.

In one embodiment, the client devices $105_1$-$105_p$ may be any wireless or wired electronic devices capable of receiving and transmitting data over wired and wireless mediums. For example, the client devices $105_1$-$105_P$ may be one or more of personal computers, laptop computers, netbook computers, wireless music players, portable telephone communication devices, smart phones, tablets, and digital televisions. In one embodiment, the client devices $105_1$-$105_P$ are digital devices that include a hardware processor, memory hierarchy, and input/output (I/O) interfaces including a wired and/or wireless interface such as an IEEE 802.3 interface. In one embodiment, the configuration of the components within the client devices $105_1$-$105_P$ may be similar to those discussed above in relation to the access point $101_1$. In other embodiments, the client devices $105_1$-$105_P$ may include more or less components than those shown in FIG. 2 in relation to the access point $101_1$.

The client devices $105_1$-$105_P$ may be configured to operate on a set of frequency channels. For example, one or more of the client devices $105_1$-$105_P$ may be equipped/configured to operate on Dynamic Frequency Selection (DFS) channels while other client devices $105_1$-$105_P$ are unable to operate on these DFS channels. Accordingly, the network system 100 must be configured to assign wireless channels to access points $101_1$-$101_N$ to ensure balanced coverage throughout the network system 100 for client devices $105_1$-$105_P$ of each type, to minimize effects of wireless interference in the network system 100 or wireless channel overlap with other higher priority systems, to increase fault tolerance in the network system 100, and/or to generally improve the coverage and quality of connections in the network system 100.

In one embodiment, the network controllers $103_1$-$103_M$ are digital devices that include a hardware processor, memory hierarchy, and input/output (I/O) interfaces including a wired and/or wireless interface such as an IEEE 802.3 interface. In one embodiment, the configuration of the components within the network controllers $103_1$-$103_M$ may be similar to those discussed above in relation to the access point $101_1$. In other embodiments, the network controllers $103_1$-$103_M$ may include more or less components than those shown in FIG. 2 in relation to the access point $101_1$.

In one embodiment, the network controllers $103_1$-$103_M$ may be any set of devices that assist the access points $101_1$-$101_N$ in performing network tasks and operations. For example, the network controllers $103_1$-$103_M$ may assist in grouping and assigning wireless channels to access points $101_1$-$101_N$ in the network system 100. Grouping and assignment of wireless channels may be performed based on various characteristics and/or factors. For example, the characteristics and/or factors may include client device $105_1$-$105_P$ capabilities (e.g., support for DFS channels), interference susceptibility, overlap of channels with other wireless systems operating on the same channels/frequencies (e.g., DFS channels may operate on the same frequencies as Radio Detection and Ranging (RADAR)), and channel regulatory requirements (e.g., equivalent isotropically radiated power (EIRP) regulatory requirements). The different processes and techniques for dynamically grouping and assigning wireless channels to access points $101_1$-$101_N$ will be discussed in greater detail below.

Although discussed above in relation to assignment of wireless channels to access points $101_1$-$101_N$, in some embodiments one or more of the access points $101_1$-$101_N$ may include multiple radios that may operate on separate wireless channels (i.e., operate on separate frequencies). In these embodiments, each radio in each of the access points $101_1$-$101_N$ may be assigned a separate wireless channel. In some embodiments, channel grouping and/or assignment may take into account that multiple radios are included in a single access point $101_1$-$101_N$. For example, a process for assigning channels to radios/access points $101_1$-$101_N$ may avoid assignment of multiple low priority or multiple high priority wireless channels to radios within the same access point $101_1$-$101_N$. In this fashion, wireless channel diversity based on priority level may be improved for areas surrounding each access point $101_1$-$101_N$.

Grouping and Assigning Wireless Channels to Access Points $101_1$-$101_N$

Figure 3:
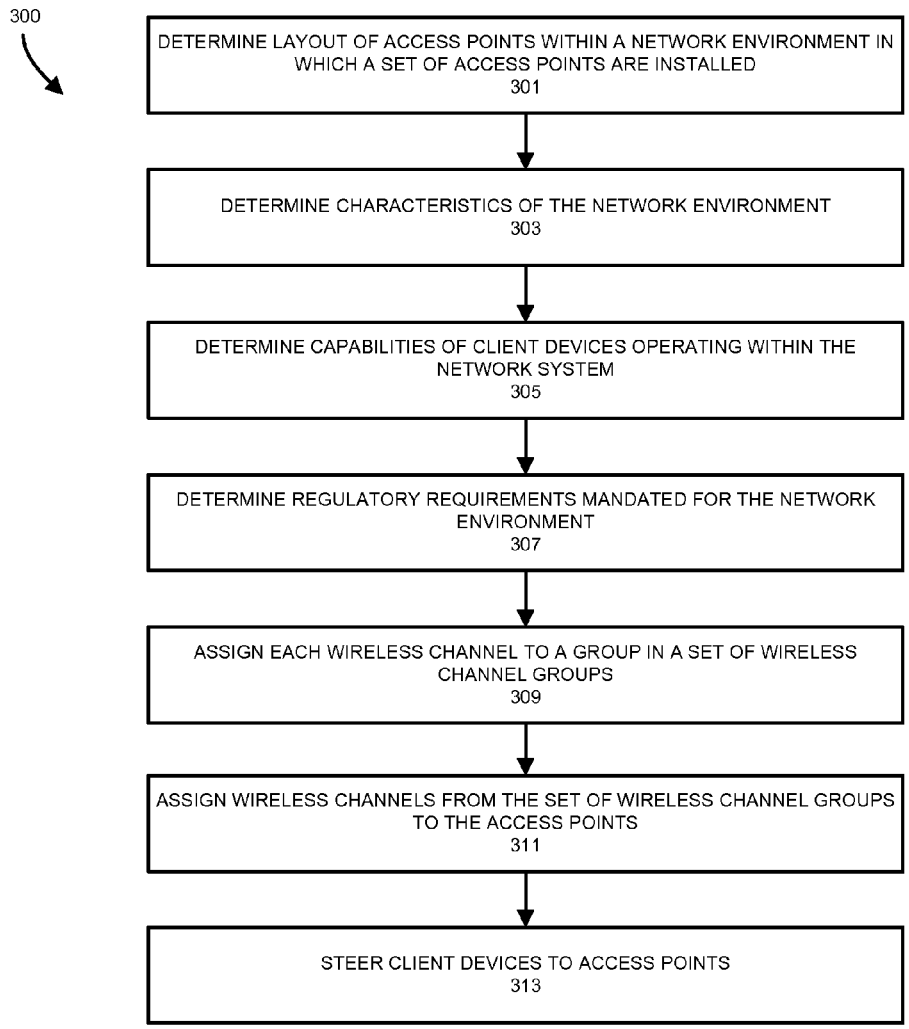
FIG. 3 shows a method for dynamically assigning wireless channels to priority groups and access points according to one embodiment.

FIG. 3 shows a method 300 for dynamically grouping and assigning wireless channels to access points $101_1$-$101_N$ according to one embodiment. The method 300 may be performed by one or more devices in the network system 100. For example, the method 300 may be performed by one or more of the network controllers $103_1$-$103_M$ in conjunction with one or more of the access points $101_1$-$101_N$. In one embodiment, one of the network controllers $103_1$-$103_M$ may be designated as a master network controller in the network system 100 such that each operation of the method 300 is performed by this designated master network controller. In another embodiment, the method 300 may be entirely performed by one or more access points $101_1$-$101_N$.

Although each of the operations in the method 300 are shown and described in a particular order, in other embodiments, the operations of the method 300 may be performed in a different order. For example, although the operations of the method 300 are shown as being performed sequentially, in other embodiments the operations of the method 300 may be performed concurrently or during partially overlapping time periods.

In the description of the method 300 that follows it is assumed that each access point $101_1$-$101_N$ includes a single radio. In this scenario, assignment of wireless channels to access points $101_1$-$101_N$ is understood to be in relation to each radio within these access points $101_1$-$101_N$. In other embodiments, the method 300 may be similarly applied to access points $101_1$-$101_N$ with multiple radios such that each radio in each access point $101_1$-$101_N$ is individually analyzed for assignment of a corresponding wireless channel.

Figure 4:
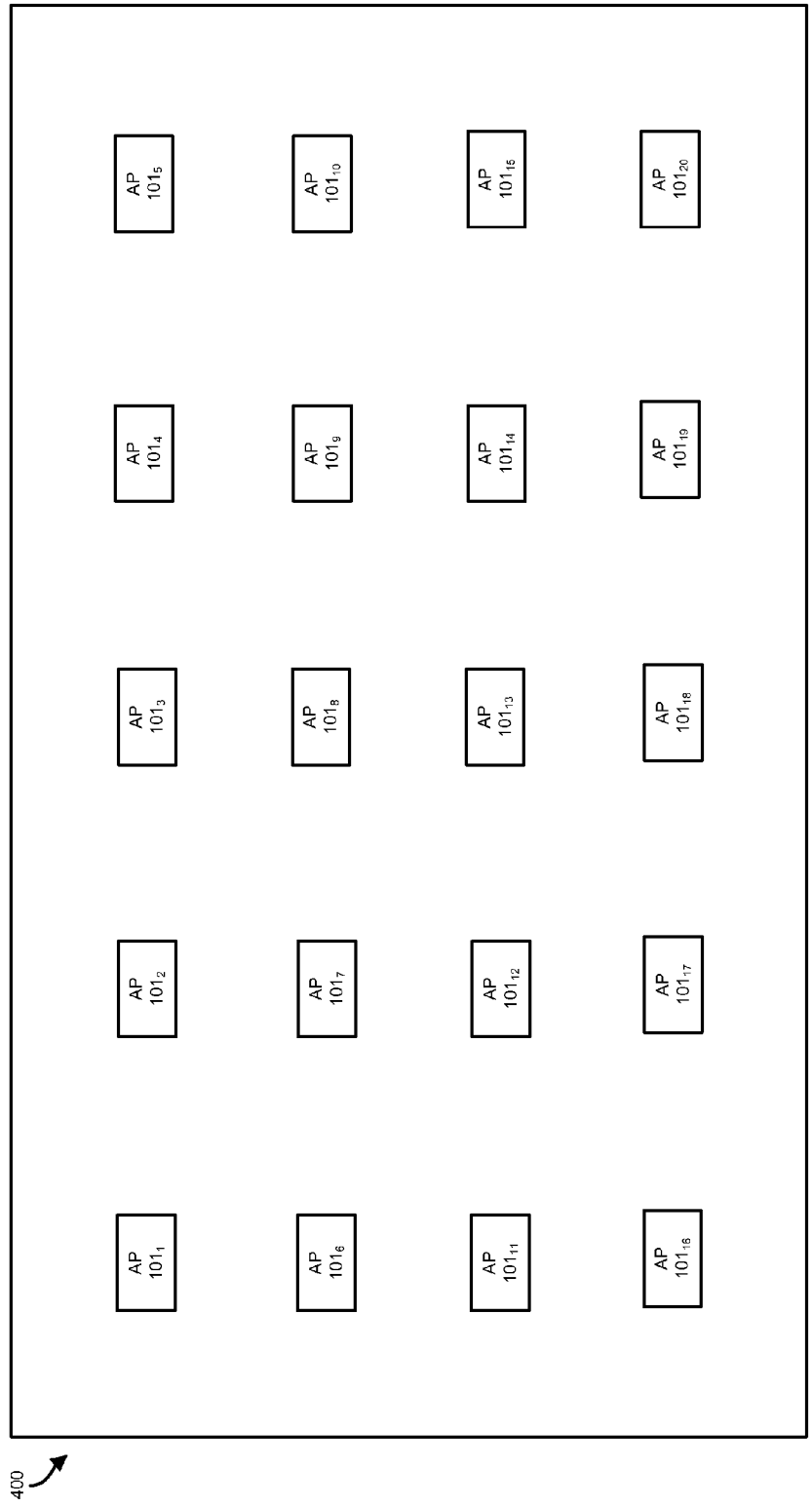
FIG. 4 shows a set of access points installed in a building according to one embodiment.

In one embodiment, the method 300 may commence at operation 301 with the determining of the layout of the access points $101_1$-$101_N$ in the network environment in which the network system 100 is installed. For example, the network system 100, including the access points $101_1$-$101_N$, may be installed in an office building or another structure. FIG. 4 shows an example set of access points $101_1$-$101_{20}$ installed in an office building 400. In this embodiment, the office building 400 defines the network environment in which the access points $101_1$-$101_{20}$ are installed.

In one embodiment, operation 301 may determine the layout of the access points $101_1$-$101_N$ in the network environment based on signal strength values from wireless signals transmitted and detected by the access points $101_1$-$101_N$. For example, the access points $101_1$-$101_N$ may each emit a set of wireless signals in the network environment. These wireless signals may be for the purpose of transmitting data between the corresponding access points $101_1$-$101_N$ and another device and unrelated to the determination of access point $101_1$-$101_N$ layout (e.g., application data and/or control signals transmitted over an established connection between an access point $101_1$-$101_N$ and another wireless device) or the wireless signals may be emitted for the purpose of determining access point $101_1$-$101_N$ layout. Upon detection of these wireless signals, an access point $101_1$-$101_N$ may determine a power level of the received signal. Together with a known transmission power of the wireless signals, the signal strength values may be used to determine the distance separating the access points $101_1$-$101_N$ and direction of each access point $101_1$-$101_N$ relative to each other in the network environment. In one embodiment, the signal strength indicators corresponding to these wireless signals may be received signal strength indicator (RSSI) values.

In another embodiment, the layout of the access points $101_1$-$101_N$ may be determined based on a pre-populated access point $101_1$-$101_N$ configuration table or another data structure, which describes the physical layout of the access points $101_1$-$101_N$ in the network environment. For example, a system administrator may populate a table with a set of distance values and angle measurements describing the arrangement of the access points $101_1$-$101_N$ in the network environment. This access point $101_1$-$101_N$ layout table may have been populated during installation of the access points $101_1$-$101_N$ in the network environment.

As noted above, determination of the layout of the access points $101_1$-$101_N$ may include the angle/direction and distance between the access points $101_1$-$101_N$. In one embodiment, this information may be used to determine neighbor relationships between access points $101_1$-$101_N$. Two access points $101_1$-$101_N$ may share a neighbor relationship when there is a direct line of sight between the two access points $101_1$-$101_N$ without any intermediary access points $101_1$-$101_N$ between the two neighboring access points $101_1$-$101_N$. For example, in FIG. 4, the access points $101_1$ and $101_2$ share a neighboring relationship. Similarly, the access points $101_2$ and $101_3$ share a neighboring relationship. As noted above, this neighbor relationship between access points maybe determined by distance and/or angle measurements while in other embodiments a pre-populated table may explicitly define neighbors for each access point $101_1$-$101_N$.

Figure 5A:
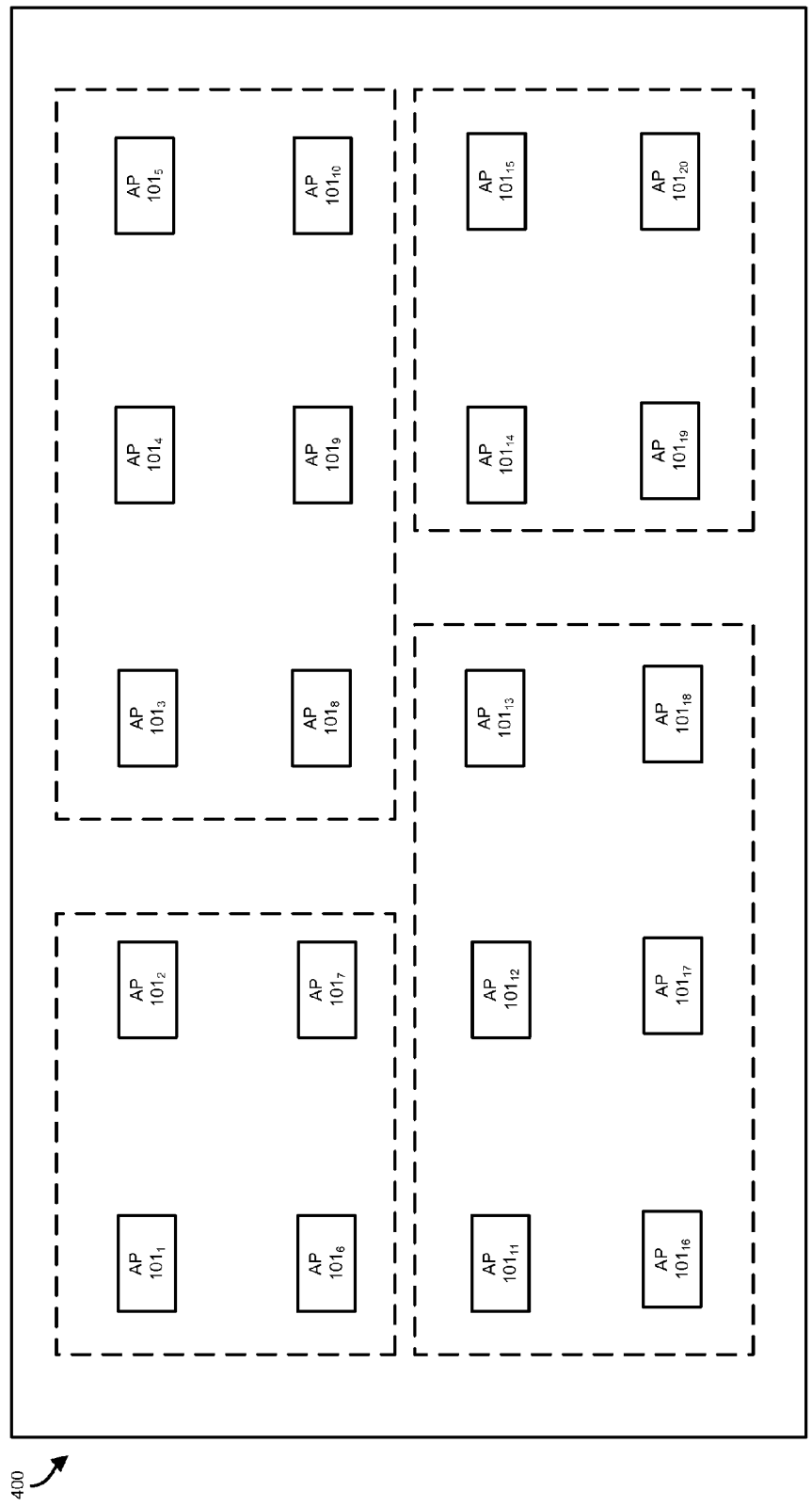
FIG. 5A shows a first set of access point neighborhoods according to another embodiment.
Figure 5B:
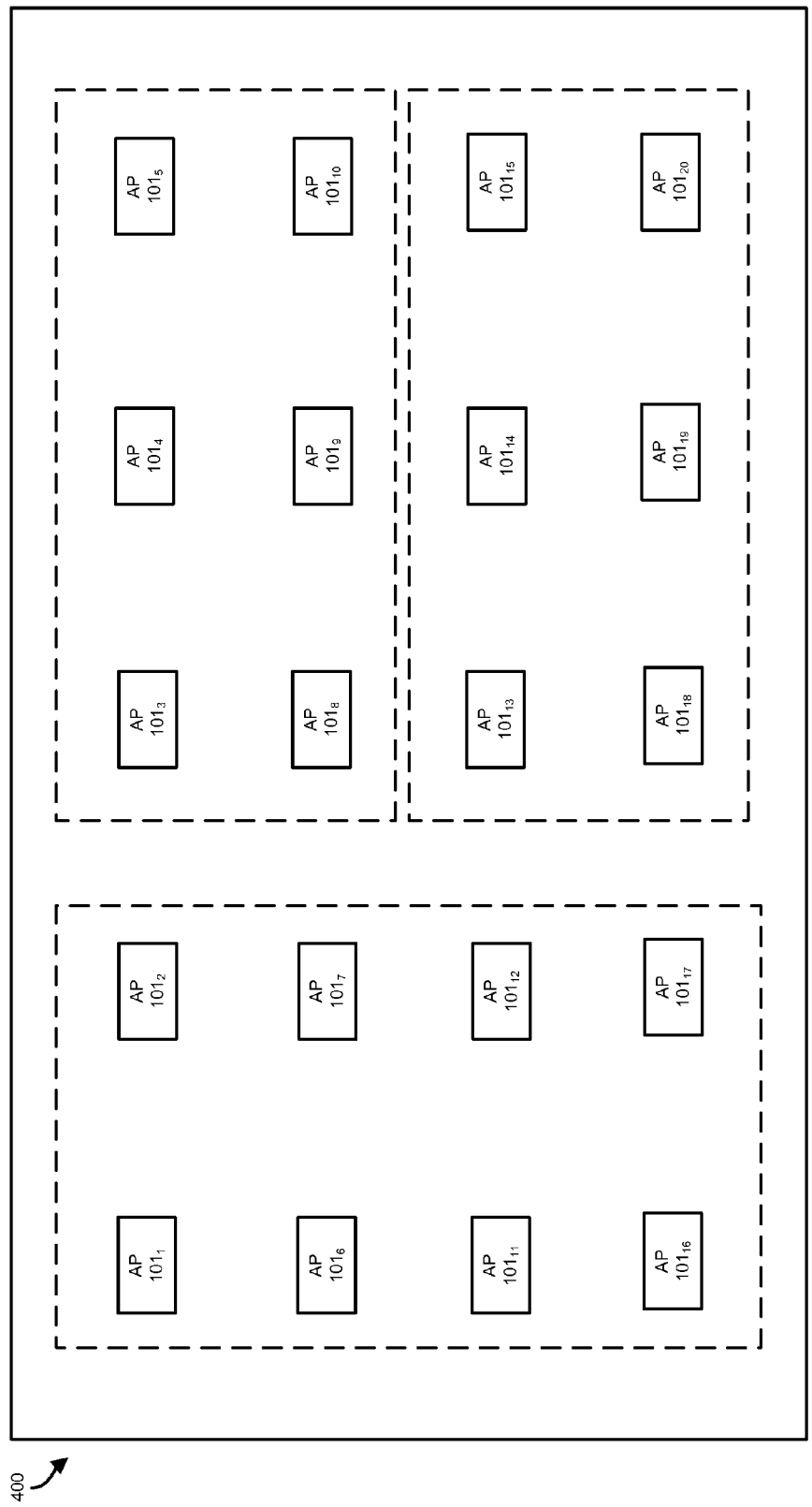
FIG. 5B shows a second set of access point neighborhoods according to another embodiment.

In one embodiment, neighborhoods of access points $101_1$-$101_N$ may be designated based on continuous sets of neighboring access points $101_1$-$101_N$. For example, FIG. 5A shows a set of neighborhoods, which are designated by dashed boxes. FIG. 5B shows a separate set of neighborhoods for the same set of access points $101_1$-$101_N$. Accordingly, neighborhoods may be variably defined within a network system 100. These neighborhoods may be used as a basis for channel assignment as will be described in greater detail below. In one embodiment, neighborhoods may be defined in a pre-populated table.

In one embodiment, layout information determined at operation 301 may also be used to determine edge access points $101_1$-$101_N$. Edge access points $101_1$-$101_N$ are access points $101_1$-$101_N$ that lie on the outside boundaries of the network environment. For example, in FIG. 4 the access points $101_1$-$101_6$, $101_{10}$, $101_{11}$, and $101_{15}$-$101_{20}$ may be considered edge access points $101_1$-$101_N$ based on their location around the periphery of the network environment in contrast to the access points $101_7$-$101_9$ and $101_{12}$-$101_{14}$, which are nested within the perimeter created by the edge access points $101_1$-$101_6$, $101_{10}$, $101_{11}$, and $101_{15}$-$101_{20}$.

At operation 303, characteristics of the network environment may be determined. The characteristics of the network environment may include detection of the presence of radio-frequency (RF) interference or wireless channel overlap with other higher priority systems. For example, microwave interference (i.e., electromagnetic interference at approximately 2.4 GHz) may be detected within the network environment. The microwave interference may be caused by one or more of a telephone, a baby monitor, a Bluetooth device, a car alarm, a microwave oven, and other devices that operate at or around 2.4 GHz or emit radio waves at or around 2.4 GHz. This microwave interference may affect certain wireless channels more than other channels. For example, IEEE 802.11b/g/n may operate between 2.412 GHz and 2.484 GHz with 16.25 MHz to 22 MHz of channel separation. In this situation, microwave interference may affect particular wireless channels (i.e., frequency ranges) more severely than other wireless channels. Accordingly, operation 303 may indicate the range of wireless channels and/or frequency ranges that are affected by detected microwave interference in the network environment.

In one embodiment, operation 303 may detect signals from RADAR systems and/or military systems operating or generating wireless signals around 5 GHz. For example, operation 303 may detect wireless signals from other systems in the 5.250 GHz-5.350 GHz and 5.470 GHz-5.725 GHz spectrums. Wireless signals in these frequency ranges may be the product of RADAR (e.g., Terminal Doppler Weather RADAR (TDWR) systems) and/or military systems. Additionally, wireless signals from RADAR and military systems may affect certain wireless channels more than other channels. Accordingly, operation 303 may indicate the range of wireless channels and/or frequency ranges that are affected by detected RADAR and military system wireless signals in the network environment (i.e., wireless channels used by RADAR and military system).

Although described in relation to wireless signals from RADAR and military systems, in other embodiments wireless signals that overlap with frequencies used by the network system 100 may be generated by other sources that are detected at operation 303. Accordingly, the description above is purely for illustrative purposes and in other embodiments operation 303 may detect all forms of other wireless signals active in the network environment, which may affect wireless channel performance.

At operation 305 the capabilities of the client devices $105_1$-$105_P$ may be determined. In one embodiment, the capabilities may be relative to currently associated client devices $105_1$-$105_P$ in the network system 100 while in other embodiments capabilities may be determined relative to historical trends or analysis of client devices $105_1$-$105_P$ associated with access points $101_1$-$101_N$ in the network system 100.

In one embodiment, the capabilities of the client devices $105_1$-$105_P$ may include the ability to support Dynamic Frequency Selection (DFS) channels. DFS is the process of detecting RADAR signals, which, based on government regulations, must be protected against 5.0 GHz interference (e.g., IEEE 802.11a/n/ac radios). Upon detection of 5.0 GHz interference, DFS causes access points $101_1$-$101_N$ to switch the operating frequency of the 5.0 GHz radio to a channel that is not being used by the nearby RADAR or military systems. Transmission Power Control (TPC) may also be used to adapt the transmission power of a radio based on regulatory requirements and range information to further avoid this overlapping with frequencies used with RADAR or military systems.

Originally, the 5 GHz band had a total of nine 20 MHz non-DFS channels in the United States (i.e., channels that do not overlap with frequencies being used by RADAR and/or military systems). However, after the introduction of 40 MHz channels in IEEE 802.11n and 80 MHz in IEEE 802.11ac, the number of available non-DFS channels has reduced significantly. Currently, only four 40 MHz non-DFS channels or two 80 MHZ channels are present in these standards. These newly available widths cause non-DFS channels to be crowded. This is especially evident in highly dense network environments. In order to solve this density issue, network administrators either attempted to disable 40 MHz and 80 Mhz channels or began to utilize DFS channels. However, each of these solutions may pose issues.

In particular, when 40 MHz and 80 Mhz channels are disabled, client devices $105_1$-$105_P$ may not enjoy the high speed experience provided by these channel widths. Further, if DFS channels are exclusively or significantly used, client devices $105_1$-$105_P$ that do not support DFS channels may suffer. Namely, if all access points $101_1$-$101_N$ proximate to a DFS incapable client device $105_1$-$105_P$ are on DFS channels, this DFS incapable client device $105_1$-$105_P$ will either not see a SSID or connect to a faraway access point $101_1$-$101_N$ on a non-DFS channel. Connecting to a faraway access point $101_1$-$101_N$ may result in the client device $105_1$-$105_P$ experiencing latency issues or a generally poor user experience. To better address these issues, the method 300 may intelligently distribute/assign wireless channels to access points $101_1$-$101_N$ in the network environment such that balanced coverage may be achieved for the capabilities of client devices $105_1$-$105_P$ represented in the network system 100. Techniques for channel distribution will be described in greater detail below.

In some embodiments, other capabilities of the client devices $105_1$-$105_P$ may be determined at operation 305. For example, operation 305 may determine channels that are not supported by client devices $105_1$-$105_P$. Channel support may be based on current client devices $105_1$-$105_P$ in the network system 100, historic averages of client devices $105_1$-$105_P$ associating with access points $101_1$-$101_N$ within the network system 100, and/or general client device $105_1$-$105_P$ channel support.

At operation 307, regulatory requirements for the network environment may be determined. The regulatory requirements may include 1) DFS channel restrictions and procedures for handling DFS channel assignment, 2) equivalent isotropically radiated power (EIRP) regulatory requirements (i.e., regulations that indicate EIRP levels for particular channels), and/or 3) the set of legally allowed wireless local area network channels in the network environment (e.g., the available channels using IEEE 802.11 protocols). In one embodiment, these regulatory requirements may be determined based on the location of the network system 100 (e.g., the country, state, country, and/or city of the network system 100) and may be determined by querying a remote regulatory server or by examining regulations previously stored in memory (e.g., the data storage 203).

As noted above, one or more of the operations in the method 300 may be performed in a different order than shown and described. For example, operations 301, 303, 305, and 307 may be performed in a different order, including during partially or fully overlapping time periods.

Following the determination of the layout of the access points $101_1$-$101_N$ at operation 301, the determination of characteristics of the network environment at operation 303, the determination of the capabilities of client devices $105_1$-$105_P$ at operation 305, and the determination of the regulatory requirements of the network environment at operation 307, operation 309 may assign each available wireless channel into groups. In one embodiment, these groups may indicate the priority of associated wireless channels. For example, the channels 1-11 corresponding to the 2.4 GHz spectrum and the channels 36, 40, 44, 48, 52, 56, 60, 64, 100, 104, 108, 112, 116, 132, 136, 140, 149, 153, 157, 161, and 165 corresponding to the 5 GHz spectrum may be available for assignment to access points $101_1$-$101_N$. Table 1 below shows the center frequency of these channels.

TABLE 1

| Channel Number | Center Frequency (Hz) |
| --- | --- |
| 1 | 2412 |
| 2 | 2417 |
| 3 | 2422 |
| 4 | 2427 |
| 5 | 2432 |
| 6 | 2437 |
| 7 | 2442 |

TABLE 1-continued

| Channel Number | Center Frequency (Hz) |
| --- | --- |
| 8 | 2447 |
| 9 | 2452 |
| 10 | 2457 |
| 11 | 2462 |
| 36 | 5180 |
| 40 | 5200 |
| 44 | 5220 |
| 48 | 5240 |
| 52 | 5260 |
| 56 | 5280 |
| 60 | 5300 |
| 64 | 5320 |
| 100 | 5500 |
| 104 | 5520 |
| 108 | 5540 |
| 112 | 5560 |
| 116 | 5580 |
| 132 | 5660 |
| 136 | 5680 |
| 140 | 5700 |
| 149 | 5745 |
| 153 | 5765 |
| 157 | 5785 |
| 161 | 5805 |
| 165 | 5825 |

The above channels are 20 MHz wide channelsI; however, in other embodiments other channels and/or frequencies may be used (e.g., 40 MHz or 80 MHz). In this example set of channels shown above, each channel may be assigned to priority groups based on characteristics of the channels, characteristics of the network environment, and/or regulatory requirements for the network environment. For example, channels that are especially prone to RF interference caused by nearby devices may be assigned to a lower priority group. RF interference may be microwave interference (e.g., caused by one or more of a telephone, a baby monitor, a Bluetooth device, a car alarm, a microwave oven, and other devices that operate at 2.4 GHz or emitting radio waves at 2.4 GHz). In other embodiments, channels that overlap with frequencies being used by higher priority systems may cause assignment of a lower priority to these channels (e.g., DFS channels operating on RADAR/military system frequencies).

In one embodiment, the determination of channels that are prone to interference may be determined based on the characteristics of the network environment, which was determined at operation 303. In this embodiment, the RF characteristics of the network environment may be examined to determine particular frequency ranges for which RF interference is present. Upon the detection of interference in the frequency range of a particular set of channels, these channels may be assigned to a low priority group. For example, upon detecting RF interference in the network environment in the range of 2412 Hz-2427 Hz, operation 309 may determine that channels 1-4 corresponding to this frequency range in Table 1 will be affected. Accordingly, operation 309 may assign the channels 1-4 to a low priority group since these channels may be prone to RF interference in the current network environment.

In another example, the network environment characteristics determined at operation 303 may include a detection of RADAR signals. In this embodiment, DFS channels may be affected by these RADAR signals. Upon the detection of RADAR signals, operation 309 may assign one or more DFS channels to low priority groups. In one embodiment, only DFS channels in frequency ranges in which RADAR signals are detected may be assigned to low priority groups.

Although described as assignment of channels to groups based on current RF conditions in the network environment, in one embodiment assignment of channels may be based on typical and/or historic conditions. For example, channels that have historically experienced interference in the network environment and/or in other network environments may be assigned to low priority groups.

Operation 309 may also assign channels to groups based on low support by the client devices $105_1$-$105_P$. For example, operation 305 may determine that one or more of the client devices $105_1$-$105_P$ may not support DFS channels. Accordingly, DFS channels may be moved to lower priority groups based on the level of support by the client devices $105_1$-$105_P$. Conversely, high support for particular channels may cause these popular channels to be assigned to higher priority groups.

In some embodiments, assignment of channels to priority groups may be performed to ensure some coverage for these types of channels in higher priority groups. For example, in some embodiments, upon determining that only a few client devices $105_1$-$105_P$ support DFS channels, a corresponding few DFS channels may be assigned to higher priority channel groups and each remaining DFS channel may be assigned to lower priority groups. Accordingly, DFS channels may ensure some coverage in the network system 100 without over representation of these low supported channels.

Although described in relation to support of the client devices $105_1$-$105_P$ currently operating within the network system 100, in some embodiments typical and/or historic support for channels may be used for channel assignment. For example, channels that are historically supported by most wireless devices may be assigned to higher priority groups while channels that are historically supported by only a small number of wireless devices may be assigned to lower priority groups. This historic analysis may be in relation to the current network system 100 and/or other network systems.

In one embodiment, channels may be assigned to groups at operation 309 based on high or low equivalent isotropically radiated power (EIRP) regulatory levels. For example, particular channels may be regulated by country, state, county, or city ordinances that restrict power levels for these channels above a particular amount. Channels that have EIRP levels that are below a particular threshold may be assigned to a lower priority group at operation 309. In contrast, channels that have EIRP levels that are above a particular threshold may be assigned to a higher priority group at operation 309.

In one embodiment, the grouping of channels may be stored in a table or another data structure at operation 309. For example, Table 2 includes a field/column indicating the group assigned to each wireless channel. In this example, four groups of decreasing priority are listed (i.e., group 1 has a higher priority than group 2).

TABLE 2

| Channel Number | Center Frequency (Hz) | Priority Group (1-4) |
|---|---|---|
| 1 | 2412 | 4 |
| 2 | 2417 | 4 |
| 3 | 2422 | 4 |
| 4 | 2427 | 4 |
| 5 | 2432 | 1 |
| 6 | 2437 | 1 |
| 7 | 2442 | 1 |
| 8 | 2447 | 2 |
| 9 | 2452 | 2 |
| 10 | 2457 | 1 |
| 11 | 2462 | 1 |
| 36 | 5180 | 1 |

TABLE 2-continued

| Channel Number | Center Frequency (Hz) | Priority Group (1-4) |
|---|---|---|
| 40 | 5200 | 1 |
| 44 | 5220 | 2 |
| 48 | 5240 | 2 |
| 52 | 5260 | 2 |
| 56 | 5280 | 2 |
| 60 | 5300 | 2 |
| 64 | 5320 | 2 |
| 100 | 5500 | 3 |
| 104 | 5520 | 3 |
| 108 | 5540 | 3 |
| 112 | 5560 | 3 |
| 116 | 5580 | 3 |
| 132 | 5660 | 3 |
| 136 | 5680 | 3 |
| 140 | 5700 | 3 |
| 149 | 5745 | 1 |
| 153 | 5765 | 1 |
| 157 | 5785 | 1 |
| 161 | 5805 | 1 |
| 165 | 5825 | 1 |

Although factors and criteria for assigning channels to groups have been described individually above, in some embodiments two or more sets of factors and criteria may be used for assigning wireless channels to priority groups. For example, the presence/absence of interference in the frequency range of a channel along with the capability of the client devices $105_1$-$105_P$ to support the channel may be used for wireless channel priority group assignment at operation 309.

In some embodiments, special conditions may be made to ensure particular channels are represented in higher or lower priority groups. For example, in some embodiments a special condition may be established to ensure that at least one or more DFS channels are placed in a higher priority group. This assignment may be made to ensure are least one access point $10!_1$-$101_N$ is assigned a DFS channel in a later assignment operation.

Following assignment of the channels to priority groups, operation 311 may assign channels from the priority groups to access points $101_1$-$101_N$. The techniques for assigning channels to access points $101_1$-$101_N$ may be based on various factors and criteria. Several example techniques will be described in detail below. However, in other embodiments, other techniques may be used in addition to those described below for assigning wireless channels to access points $101_1$-$101_N$.

In the description of operation 311 that follows it is assumed that each access point $101_1$-$101_N$ includes a single radio. In this scenario, assignment of wireless channels to access points $101_1$-$101_N$ is understood to be in relation to each radio within these access points $101_1$-$101_N$. In other embodiments, operation 311 may be similarly applied to access points $101_1$-$101_N$ with multiple radios such that each radio in each access point $101_1$-$101_N$ is individually analyzed for assignment of a corresponding wireless channel.

In one embodiment, operation 311 may assign channels from priority groups to ensure efficient channel distribution among neighboring access points $101_1$-$101_N$. In this embodiment, the layout of the access points $101_1$-$101_N$, including the neighboring relationships between access points $101_1$-$101_N$ determined at operation 301, may be used to assign wireless channels. For example, sets of neighboring access points $101_1$-$101_N$ may be examined as a neighborhood as shown in FIG. 5A and FIG. 5B. In this example, no neighborhood may have a higher concentration of channels from low priority groups and/or or a higher concentration of channels from high priority groups than any other neighborhoods. For instance, using the priority groups in Table 2 and the neighborhoods in FIG. 5A, if the access points $101_1$, $101_2$, $101_6$, and $101_7$ define a first neighborhood and the access points $101_3$-$101_5$ and $101_8$-$101_{10}$ define a second neighborhood, operation 311 may assign an equal number of channels from the high priority groups 1 and 2 to both the access points $101_1$, $101_2$, $101_6$, and $101_7$ in the first neighborhood and the access points $101_3$-$101_5$ and $101_8$-$101_{10}$ in the second neighborhood. Similarly, operation 311 may assign an equal number of channels from the low priority groups 3 and 4 to both the access points $101_1$, $101_2$, $101_6$, and $101_7$ in the first neighborhood and the access points $101_3$-$101_5$ and $101_8$-$101_{10}$ in the second neighborhood. In this example, assignment from lower priority groups may only be performed after channels from higher priority groups have been exhausted. In some embodiments, the number of channels in each group from each neighborhood does not need to be equal, but instead must be within some difference threshold in comparison to other groups.

In one embodiment, operation 311 may assign channels from priority groups to ensure balanced coverage of high priority channels throughout the network environment. In this embodiment, high priority channels are assigned to access points $101_1$-$101_N$ such that at least one high priority channel is available to most if not all locations in the network environment. For example, operation 311 may examine the layout of access points $101_1$-$101_N$ determined at operation 301 to establish the expected coverage area of each of these access points $101_1$-$101_N$. Upon establishing coverage areas of each access point $101_1$-$101_N$, including overlapping wireless coverage, operation 311 may determine a distribution of wireless channels from the priority group 1 and/or the priority group 2 (e.g., the high priority channel groups) such that the percentage of area covered by high priority channels is maximized. After distribution of high priority channels, remaining access points $101_1$-$101_N$ may be assigned a wireless channel from the remaining lower priority groups (e.g., groups 3 and 4).

As noted above, in some embodiments one or more of the access points $101_1$-$101_N$ may include multiple radios that may operate on separate wireless channels (i.e., operate on separate frequencies). In these embodiments, each radio in each of the access points $101_1$-$101_N$ may be assigned a separate wireless channel. In some embodiments, channel assignment may take into account that multiple radios are included in a single access point $101_1$-$101_N$. For example, operation 311 may avoid assignment of multiple low priority or multiple high priority wireless channels to radios within the same access point $101_1$-$101_N$. In this fashion, wireless channel diversity based on priority level may be improved for areas surrounding each access point $101_1$-$101_N$.

Although described above as assigning both channels from high priority and low priority groups, in some embodiments channels from low priority groups may only be assigned when channels from higher priority groups fail to meet one or more criteria. For example, one or more channels from a low priority group may be necessary to meet a performance threshold, provide network availability for each client device $105_1$-$105_P$, a minimum throughput threshold, a maximum bandwidth threshold, a maximum congestion level, etc.

In one embodiment, operation 311 may assign channels from priority groups to ensure increased fault tolerance in the network system 100. In this embodiment, channels in lower priority groups may be surrounded by channels from higher priority groups. For example, the access points $101_1$-$101_3$, $101_6$, $101_8$, $101_{11}$, $101_{13}$, and $101_{16}$-$101_{18}$ in FIG. 4 may be assigned channels from the groups 1 and 2 while access points $101_7$ and $101_{12}$ may be assigned channels from the groups 3 and 4. In this fashion, the access points $101_1$-$101_3$, $101_6$, $101_8$, $101_{11}$, $101_{13}$, and $101_{16}$-$101_{18}$ with high priority channels may surround the access points $101_7$ and $101_{12}$ with low priority channels. By surrounding low priority channels with high priority channels, operation 311 may ensure that any faults or quality issues that may occur on low priority channels (e.g., the channels in the groups 3 and 4) may be overcome by nearby high priority channels. As noted above in relation to operation 309, these high priority channels are less likely affected by interference or other problems that may cause deterioration in the quality of coverage. Further, these high priority channels may be highly compatible with more client devices $105_1$-$105_P$. However, by still allowing lower priority channels to be assigned to access points $101_1$-$101_N$ the method 300 ensures wide support for many different types of client devices $105_1$-$105_P$.

In one embodiment, channel assignment at operation 311 may be performed based on the location of the access points $101_1$-$101_N$ in the network environment. In this embodiment, the layout of the access points $101_1$-$101_N$ determined at operation 301 may be used for assigning channels. For example, channels in higher priority groups may be assigned to edge access points $101_1$-$101_N$, while non-edge access points $101_1$-$101_N$ may be assigned channels from low priority groups. For instance, the access points $101_1$-$101_6$, $101_{10}$, $101_{11}$, and $101_{15}$-$101_{20}$ in FIG. 4 may be considered edge access points $101_1$-$101_N$ based on their location around the periphery of the network environment in contrast to the access points $101_7$-$101_9$ and $101_{12}$-$101_{14}$ which are nested within the perimeter created by the edge access points $101_1$-$101_6$, $101_{10}$, $101_{11}$, and $101_{15}$-$101_{20}$. These edge access points $101_1$-$101_6$, $101_{10}$, $101_{11}$, and $101_{16}$-$101_{29}$ may be assigned wireless channel from high priority groups while the non-edge access points $101_7$-$101_9$ and $101_{12}$-$101_{14}$ may be assigned wireless channels from low priority groups. As noted above, channels in low priority groups may be more susceptible to interference or frequency overlap from externals sources. By nesting low priority channels, which are sensitive to interference, inside the network environment, low priority channels are less likely to be affected by interference since these access points $101_7$-$101_9$ and $101_{12}$-$101_{14}$ are more distant from possible sources of interference.

Figure 6A:
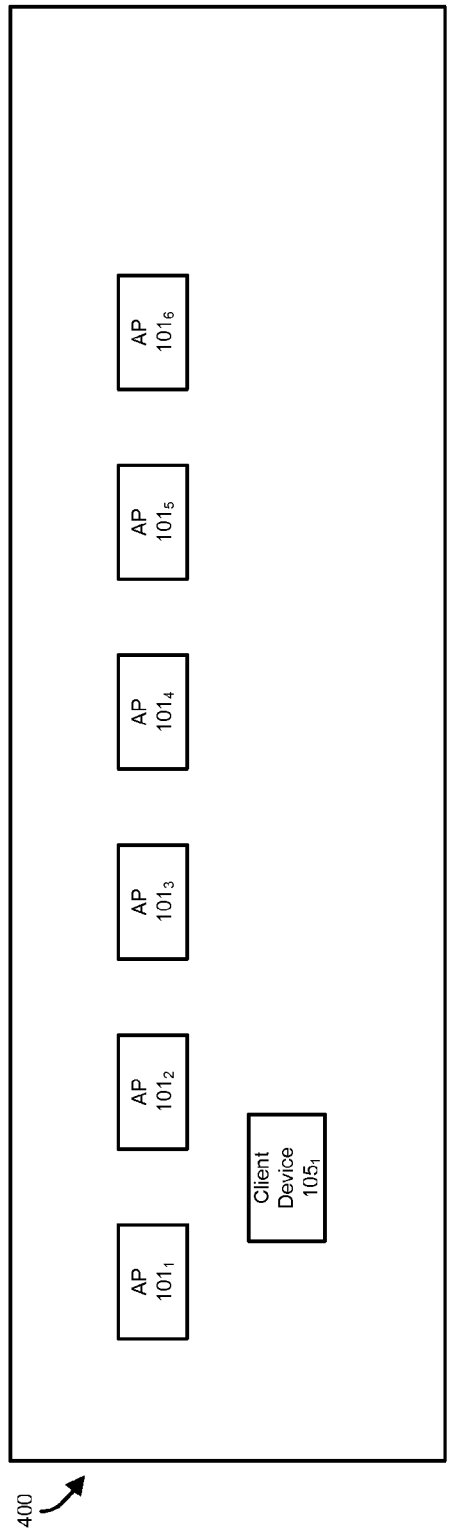
FIG. 6A shows a client device in a first position in relation to a set of access points according to one embodiment.
Figure 6B:
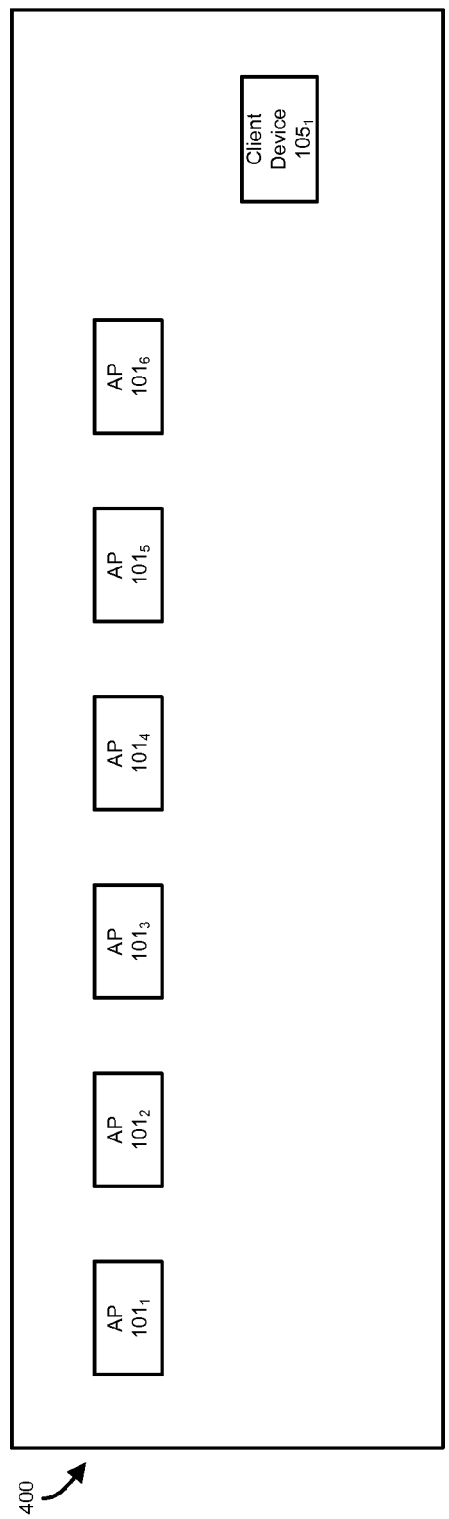
FIG. 6B shows the client device in a second position in relation to a set of access points according to another embodiment.
Figure 6C:
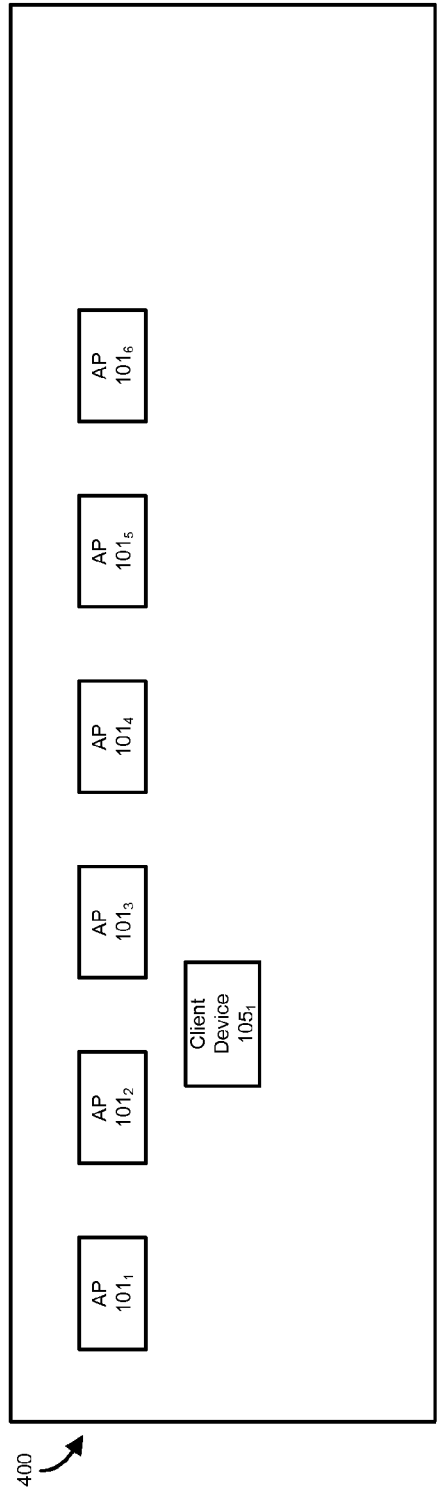
FIG. 6C shows the client device in a third position in relation to a set of access points according to another embodiment.

Although the example techniques provided above are discussed individually, in some embodiments multiple techniques and/or factors may be used at operation 311 for assignment of channels to access points $101_1$-$101_N$. For example, in some embodiments channel assignment to access points $101_1$-$101_N$ may ensure both balanced distribution of channels from each group and increased fault tolerance based on the locations of the access points $101_1$-$101_N$. For example, FIG. 6A shows a set of access points $101_1$-$101_6$ and a client device $105_1$. In this example, the client device $105_1$ may be DFS incapable. In this situation, operation 311 may ensure that edge access points $101_1$ and $101_6$ do not use DFS channels. This prevents the situation where the client device $105_1$ is in a corner location, as shown in FIG. 6B, and the closest available access point $101_1$-$101_6$ is the access point $101_5$. Since the access point $101_5$ may be relatively far from the client device $105_1$, connection quality issues may be a problem for the client device $105_1$. Further, operation 311 may ensure that neighboring access points $101_1$-$101_N$ are not both on DFS channels. For example, if both access points $101_2$ and $101_3$ are on DFS channels and both the access points $101_1$ and $101_4$ are on non-DFS channels and the client device $105_1$ is situated as shown in FIG. 6C, the client device $105_1$ will attempt to associate with one of the access points $101_1$ and $101_4$, which is considerably farther away from the client device $105_1$ in comparison to the access points $101_2$ and $101_3$. Accordingly, even though an even number of access points $101_1$-$101_N$ may be assigned high/low priority channels (e.g., non-DFS and DFS channels) in a particular neighborhood, assigning neighboring access points $101_1$-$101_N$ to either high or low priority channels (e.g., non-DFS or DFS channels) may create quality issues (i.e., increased faults). Accordingly, in FIG. 6C the access points $101_1$-$101_6$ may be alternatively assigned DFS channels to ensure full coverage for the client device $105_1$ while roaming through the network environment.

Further, in one embodiment, a client device $105_1$ shown in FIG. 6C may be associated with the access point $101_2$. In this embodiment, the client device $105_1$ may not support any of the other channels on which other proximate access points $101_1$ $101_3$ are operating. In this situation, operation 311 should not alter the channel assignment for the access point $101_2$ with which the client device $105_1$ is associated as this reassignment may cause the client device $105_1$ to be unable to associate with a proximate access point $101_1$ or $101_3$. In turn, this may cause connectivity issues for the client devices $105_1$-$105_P$.

In one embodiment, operation 313 may steer client devices $105_1$-$105_P$ to less crowded access points $101_1$-$101_N$. For example, access points $101_1$-$101_N$ may be assigned DFS and non-DFS channels at operation 311. In some situations, since many client devices $105_1$-$105_P$ may not support DFS channels, the non-DFS channels/access points $101_1$-$101_N$ may become heavily crowded with both DFS capable client devices $105_1$-$105_P$ and DFS incapable client devices $105_1$-$105_P$. To alleviate this overcrowding on non-DFS channels, operation 313 may steer DFS capable client devices $105_1$-$105_P$ to access points $101_1$-$101_N$ using DFS channels.

As described above, the method 300 may assign wireless channels to priority groups based on characteristics of the channels, the environment in which the channels will be used, regulatory requirements, and/or capabilities of the client devices $105_1$-$105_P$. Thereafter, channels may be intelligently assigned to access points $101_1$-$101_N$ to achieve one or more goals. For example, wireless channels may be assigned to access points $101_1$-$101_N$ to ensure balanced coverage throughout the network system 100 for client devices $105_1$-$105_P$ of each type/capability, to minimize effects of wireless interference in the network system 100, to increase fault tolerance in the network system 100, and/or to generally improve the coverage and quality of connections in the network system 100.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages is applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   assigning a first subset of two or more channels, of a plurality of channels, to a first group of channels of a first priority level based on a level of support of the channels in the first subset by client devices;
   assigning a second subset of channels, of the plurality of channels, to a second group of channels of a second priority level different from the first priority level based on a level of support of the channels in the second subset by the client devices;
   determining that a first access point is located within a radio frequency range of a second access point;
   responsive to determining that the first access point is located within the radio frequency range of the second access point, configuring the first access point to use one of the channels from the first group of channels of the first priority level and configuring the second access point to use one of the channels from the second group of channels of the second priority level.

2. The medium of claim 1, wherein the first group of channels comprises Dynamic Frequency Selection (DFS) channels and wherein the second group of channels comprises non-DFS channels.

3. The medium of claim 1, wherein the first group of channels comprises channels associated with a first frequency of RADAR detections and the second group of channels comprises channels associated with a second frequency of RADAR detections different than the first frequency of RADAR detections.

4. The medium of claim 1, wherein assigning the first subset of channels to the first group of channels is responsive to determining that each channel of the first subset of channels is associated with the first priority level, and wherein assigning the second subset of channels to the second group of channels is responsive to determining that each channel of the second subset of channels is associated with the second priority level.

5. The medium of claim 1, wherein the operations further comprise determining a number of devices to assign to the first group of channels based on a number of client devices associated with one or more characteristics of the first group of channels.

6. The medium of claim 1, wherein the operations further comprise:
   dynamically modifying a number of channels assigned to the first group of channels based on characteristics associated with detected client devices.

7. The medium of claim 1, wherein assigning the first subset of channels to the first group of channels is responsive to determining that each channel of the first subset of channels is associated with a first equivalent isotropically radiated power (EIRP) range, and wherein assigning the second subset of channels to the second group of channels is responsive to determining that each channel of the second subset of channels is associated with a second EIRP range different than the first EIRP range.

8. The medium of claim 1, wherein assigning the first subset of channels to the first group of channels is responsive to determining that each channel of the first subset of channels is associated with a first frequency of detected interference, and wherein assigning the second subset of channels to the second group of channels is responsive to determining that each channel of the second subset of channels is associated with a second frequency of detected interference different than the first frequency of detected interference.

9. The medium of claim 1, wherein assigning the first subset of channels to the first group of channels is responsive to determining that each channel of the first subset of channels is statistically prone to a first level of interference, and wherein assigning the second subset of channels to the second group of channels is responsive to determining that each channel of the second subset of channels is statistically prone to a second level of interference different than the first level of interference.

10. The medium of claim 1, wherein assigning the first subset of channels to the first group of channels is responsive to determining that each channel of the first subset of channels is associated with a first level of fault tolerance, and wherein assigning the second subset of channels to the second group of channels is responsive to determining that each channel of the second subset of channels is associated with a second level of fault tolerance different than the first level of fault tolerance.

11. The medium of claim 1, wherein the operations further comprise configuring a plurality of access points for a plurality of regions such that each region has at least one access point configured to use a channel of the first group of channels.

12. The medium of claim 1, wherein the operations further comprise configuring a plurality of access points for a plurality of regions such that each region has at least a threshold number of access points, the threshold number for each region being based on characteristics of that each region.

13. A non-transitory computer readable medium comprising instructions which, when executed by one or more hardware processors, cause performance of operations comprising:
determining that a first access point is located at an edge of a Wi-Fi coverage area and a second access point is not located at the edge of the Wi-Fi coverage area;
responsive to the determining operation:
assigning the first access point a non-Dynamic Frequency Selection (DFS) channel belonged to a first group of channels of a first priority level; and
assigning the second access point to a DFS channel belonged to a second group of channels of a second priority level different from the first priority level.

14. A non-transitory computer readable medium comprising instructions which, when executed by one or more hardware processors, cause performance of operations comprising:
partitioning a plurality of channels into two or more subsets of channels of different priority levels based on characteristics of the channels, characteristics of a network environment in which the channels are used, and regulatory requirements for the network environment, wherein each subset of channels has two or more channels;
prioritizing the two or more subsets of channels based on the characteristics of the channels and the network environment and the regulatory requirements; and
configuring an access point to select a channel from the subsets of channels based on the prioritizing operation.

15. The medium of claim 14, wherein configuring the access point comprises configuring the access point to use a channel in a low priority subset, of the plurality of channels, only when all channels in a high priority subset of the plurality of channels does not meet one or more criteria.

* * * * *